Oct. 19, 1965  J. P. KOBLENSKY  3,212,179

PROCESS FOR MANUFACTURING A GLAZING UNIT

Filed March 18, 1963

INVENTOR
JOSEPH P. KOBLENSKY

BY Fisher, Christen, Sabol & Caldwell

ATTORNEYS

United States Patent Office 3,212,179
Patented Oct. 19, 1965

3,212,179
PROCESS FOR MANUFACTURING A GLAZING UNIT
Joseph Paul Koblensky, Box 39, Markham Village, Ontario, Canada
Filed Mar. 18, 1963, Ser. No. 265,818
1 Claim. (Cl. 29—451)

This invention relates to the manufacture of thermally insulated glazing units.

It is known to use spaced glass sheets which are peripherally sealed to enclose a substantially air-tight space therebetween for the purpose of thermal insulation and noise absorption. Various methods of exhausting the air from this space have been devised employing evacuating pumps and other devices which suck or draw the air out of the space, leaving a partial vacuum between the glass sheets and thereby altering the coefficients of thermal conductivity of the assembly and acoustic conductivity. These methods require elaborate and expensive equipment.

It is also known to use various sealing compounds to bond the gasket separating the glass sheets to the glass sheets themselves. However, when the temperature differential between the two glass sheets in large, as in winter, the resultant unequal expansion of the two sheets may result in tearing of the bond between the divider and sheets with the consequent loss of the partial vacuum between the glass sheets and a consequent decrease in thermal insulating properties of the assembly.

The frame by which windows are attached to a wall surface is ordinarily a thermal conductor so that notwithstanding the fact that the window assembly may be thermally insulated, the frame itself may result in substantial heat losses from the interior to the exterior of the building.

I have found that these disadvantages may be overcome by using two or more spaced sheets of glass held apart by a resilient separating gasket which is bonded to the glass sheets with a sealing or bonding compound, which may be neoprene. The stress created by the temperature differential between the glass sheets is resisted, the bond remains intact and the pressure between the glass sheets is not altered.

I have also found that by fitting a one-way "flapper type" valve into the periphery of the resilient gasket separating the sheets and then squeezing the opposed sheets of glass toward each other, partially compressing the resilient gasket and thereby expelling air through the one-way valve, on the release of pressure, the elastic effect of the gasket and the glass sheets permits them to return to substantially their original configuration, but without the re-entry of air into the space formed between the sheets and the interleaved resilient gasket. This preserves the partial vacuum created in this space.

I also have found that by using a metal frame which holds the glazing unit in a wall surface, and which consists of two strips of metal forming a channel in which the glazing unit rests, the metal strips being separated but firmly retained by a plastic plug, the thermal conductivity of the frame is materially decreased.

With the foregoing in mind, it is among the objects of my invention to provide an effective and simple method of manufacturing a glazing unit.

Another object is the provision of a method of manufacturing a glazing unit capable of establishing and retaining a partial vacuum between the glass sheets thereof.

In drawings which illustrate embodiments of the invention,

Figure 1A:
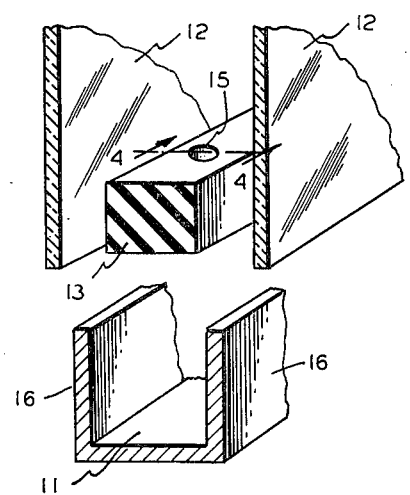
FIGURE 1A is a perspective exploded view of the components of my glazing unit before assembly.

The glazing unit illustrated comprises a channel 11, glass panes 12, and a resilient gasket 13 separating glass sheets 12. A sealing or bonding compound 14 is used to bond the gasket to the two glass sheets to create an airtight interior chamber or space with the only potential opening into the space being a one-way flapper type valve 15 set into the resilient gasket 13 and which opens to expel air through it when the unit is compressed.

Figure 2:
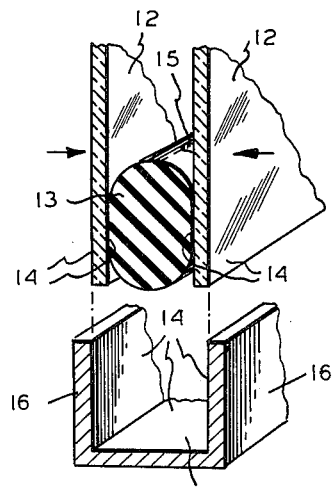
FIG. 2 is a perspective view of the unit under compression.
Figure 3:
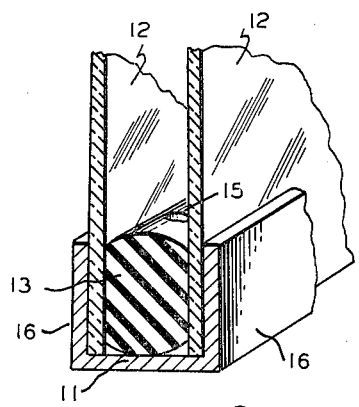
FIG. 3 is a perspective view of a portion of the assembled unit.
Figure 4:
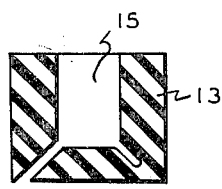
FIG. 4 is an enlarged view in cross section of the one-way valve taken along line 4—4 of FIG. 1(a).

On compression of the glass sheets 12 as shown in FIG. 2, which is best effected by placing a heavy sheet of wood on each side of the opposed glass sheets 12 to within 1" of the peripheral edges of the sheets, and then compressing the sheets of wood, the resilient gasket 13 is also compressed and air escapes through the valve. Then the channel 11 is fitted over the compressed assembly, and the gasket 13 due to its resiliency, is allowed to expand slightly, forcing glass sheets 12 against the flanges 16 of the channel 11 so that a press fit results. Because of the one-way action of the valve 15, air cannot re-enter the space between the glass sheets. The valve 15 may be a part of the gasket 13 as shown in FIG. 4, and is arranged so as to open when air is forced from within the chamber and elastically close thereatfer when compressive pressure on the glass sheets is released.

Figure 1B:
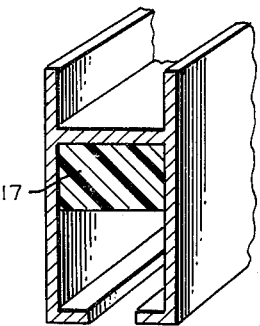
FIGURES 1B and 1C show two alternative configurations of channel pieces for use in a glazing unit embodying this invention.

As a modification, a plastic insert 17 may be attached to the channel section to further reduce the thermal conduction through the channel itself as shown in FIG. 1(b).

Figure 1C:
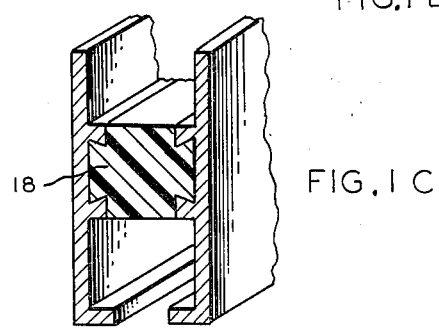

FIG. 1(c) shows a shaped plastic insert 18, which permits separate channel pieces to be used. The plastic insert reduces thermal conductivity through the channel section, and the separate channel pieces are provided with shaped openings to receive the shaped plastic insert.

What is claimed is:

In a process for manufacturing a glazing unit of the type comprising two glass sheets held spaced apart in substantially parallel relationship to each other and facing each other by resilient gasket means positioned between said glass sheets adjacent the peripheral edges of and in sealed air-tight relationship with said glass sheets, with said resilient gasket means having one-way valve means incorporated therein, the improvement which comprises compressing said resilient gasket means and decreasing the spacing between said glass sheets sufficiently to expel air from the space between said glass sheets through said one-way valve means by applying external pressure to said glass sheets, positioning clamp means at said peripheral edges of said glass sheets, said clamp means being adapted to hold said glass sheets together, and with said clamp means so positioned, releasing said external pressure to permit said resilient gasket means to expand to increase the spacing between said glass sheets, to close said one-way valve means and to force said glass sheets against said clamping means with said resilient gasket means compressed between said glass sheets, whereby the space between said glass sheets is partially evacuated and hermetically sealed.

References Cited by the Examiner
UNITED STATES PATENTS

| | | | |
|---|---|---|---|
| 1,982,351 | 11/34 | Phillips | 20—56.5 |
| 2,025,770 | 12/35 | Parkinson et al. | 20—56.5 |
| 2,570,169 | 10/51 | Verhagen | 20—56.5 |
| 2,872,713 | 2/59 | Hass | 20—56.5 |
| 2,880,475 | 4/59 | Mills | 20—56.5 |
| 3,114,179 | 12/63 | Briggs | 20—56.5 |

FOREIGN PATENTS 1,036,496  8/58  Germany.

WHITMORE A. WILTZ, *Primary Examiner.*

HARRISON R. MOSELEY, *Examiner.*